(12) United States Patent
Nguyen

(10) Patent No.: US 8,039,729 B2
(45) Date of Patent: Oct. 18, 2011

(54) QUICK CONNECT THERMOCOUPLE MOUNTING DEVICE AND ASSOCIATED METHOD OF USE

(75) Inventor: Can Trong Nguyen, Anaheim, CA (US)

(73) Assignee: Robertshaw Controls Company, Richmond, VA (US)

( * ) Notice: Subject to any disclaimer, the term of this patent is extended or adjusted under 35 U.S.C. 154(b) by 1449 days.

(21) Appl. No.: 10/907,367

(22) Filed: Mar. 30, 2005

(65) Prior Publication Data

US 2006/0219285 A1    Oct. 5, 2006

(51) Int. Cl.
    *H01L 35/02* (2006.01)
(52) U.S. Cl. ........ 136/230; 136/221; 374/208; 374/137; 374/110; 374/179
(58) Field of Classification Search ............... 136/230, 136/221; 374/208, 137, 110, 179
    See application file for complete search history.

(56) References Cited

U.S. PATENT DOCUMENTS

| | | | |
|---|---|---|---|
| 1,478,821 A | 12/1923 | Foster | |
| 3,468,723 A | 9/1969 | Lambert | |
| 3,516,873 A | 6/1970 | Bonkowski et al. | |
| 3,747,583 A | 7/1973 | Spengler et al. | |
| 3,751,305 A | 8/1973 | Huebscher | |
| 3,753,787 A | 8/1973 | Webb | |
| 3,935,032 A * | 1/1976 | Brandeberry et al. | 136/230 |
| 4,614,443 A | 9/1986 | Hamert | |
| 4,628,141 A | 12/1986 | Wieszeck et al. | |
| 4,653,935 A | 3/1987 | Daily et al. | |
| 4,758,688 A * | 7/1988 | Aschberger | 174/153 G |
| 4,826,540 A | 5/1989 | Mele | |
| 4,830,515 A | 5/1989 | Cortes | |
| 4,848,927 A | 7/1989 | Daily et al. | |
| 4,963,194 A | 10/1990 | Mele | |
| 5,261,438 A | 11/1993 | Katchka | |
| 5,342,126 A | 8/1994 | Heston et al. | |
| 5,620,016 A | 4/1997 | Katchka | |
| 5,718,512 A * | 2/1998 | Ngo-Beelmann | 374/148 |
| 5,967,766 A | 10/1999 | Katchka | |
| 6,010,327 A | 1/2000 | Katchka | |
| 6,182,944 B1 | 2/2001 | Veronese et al. | |
| 6,554,322 B2 | 4/2003 | Duong et al. | |
| 6,942,384 B2 * | 9/2005 | Schmidt | 374/208 |
| 2004/0132337 A1 | 7/2004 | Plishner | |

* cited by examiner

*Primary Examiner* — Alexa Neckel
*Assistant Examiner* — Golam Mowla
(74) *Attorney, Agent, or Firm* — Leydig, Voit & Mayer, Ltd.

(57) ABSTRACT

A thermocouple mounting assembly is provided. A plurality of retainers includes portions that are interengageable, some portions carried by a body and some portions carried by a thermocouple assembly to effect releasable mounting of a thermocouple assembly to a body. The retainers are constructed and shaped to provide for their formation by a molding process such as die-casting or investment casting, eliminating or substantially eliminating the need for machining of the retainer components. Preferably, there is an audible sound, e.g., click, present to signify when the retainers are interengaged.

18 Claims, 4 Drawing Sheets

QUICK CONNECT THERMOCOUPLE MOUNTING DEVICE AND ASSOCIATED METHOD OF USE

BACKGROUND OF THE INVENTION

Thermocouple mounting devices are well known in the industry. One common type of mounting device is a bayonet mount. This type of mounting device utilizes a cap with one or more L-shaped slots. The cap is mounted to the thermocouple. The cap is received over an end of a shank, which has at least one radially outwardly extending pin that is received within the L-shaped slot. The shank is generally mounted to an object that is to monitor temperature. Spring tension is applied to maintain that the cap and the shank are interlocked. A second type of connection is a screw in device, that is simply a threaded shank which includes the thermocouple extend therethrough. The shank is threadably received in a threaded receptacle or well. Wrench flats may be provided at one end of the shank for use of a wrench to position the thermocouple in connection with a contact surface found in the receptacle.

A third type of thermocouple mounting device can be found in U.S. Pat. No. 6,010,327 which issued to Katchka on Jan. 4, 2000, that shows a push-in snap securement device that has radially projecting fingers interengageable with a shoulder inside a receptacle. A spring is provided to maintain contact between a portion of the thermocouple and an electrical contact. In this case, the thermocouple sensor end is at the opposite end of the electrical contact end of the thermocouple assembly.

While generally effective, such known thermocouple mounts have significant drawbacks. They require a combination of various parts which increase costs and necessitates additional labor to make an assembly or to effect mounting of the thermocouple. Thermocouple mounts also, at times, requires a certain level of dimensional precision in order to ensure proper operation which can also increase costs, both for the product itself and the additional labor to effect proper assembly and testing to ensure proper operation.

When used with fuel control units, for example, the female receptacle is complex and expensive to manufacture as disclosed in U.S. Pat. No. 6,010,327. Fuel control units are used to control the flow of fuel to burners, e.g., those found in gas water heaters and furnaces. Usually, such receptacles are made of relatively soft material and are easily damaged by cross threading, a tightening tool, dropping, and the like. While the push in-type thermocouple coupling device disclosed in U.S. Pat. No. 6,010,327 is effective, it is relatively expensive and difficult to affect a repair of the thermocouple system. Screw in-type thermocouple mounts may also be damaged on the wrench flats during installation and are at times difficult to loosen which may also damage the shank particularly when the shank is made of a soft material. However, screw in-type shanks reduce the probability of accidental dislodgement of the thermocouple mounts from its desired monitoring position. When the thermocouple mounts extend out of the bottom of the unit when installed, repair is difficult because of the upside down orientation. Machining of a thermocouple retainer such as that shown in U.S. Pat. No. 6,010,327 is complex and expensive.

There is a need for a reliable thermocouple mounting device that is less complex to manufacture and utilize. The present invention is directed to overcoming one or more of the problems set forth above.

SUMMARY OF INVENTION

A thermocouple mounting assembly is provided. The mounting assembly includes a first retainer for mounting to a body such as a fuel control unit. The first retainer has an internal chamber and first and second ends with openings therein. The first end opening provides access to the chamber to provide exposure for a thermocouple portion to contact or be positioned adjacent to a member for operation of the thermocouple control system. A second end opening provides access to the chamber for a second retainer to extend through and to releasably secure a thermocouple portion within the chamber. The interior of the chamber contains a securement device to cooperatively interengage with a second securement device on the second retainer to form a bayonet mounting arrangement between the first and second retainers with the interengaging portions being shielded from external contact. The bayonet mounting arrangement releasably secures a thermocouple portion within the chamber. The bayonet mounting arrangement is constructed to prevent accidental disengagement of the second retainer from the first retainer. Preferably the mounting assembly and retainer components are molded and not machined to significantly reduce manufacturing costs.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

Like numerals throughout the various figures designate the same or similar parts.

DETAILED DESCRIPTION OF THE INVENTION

Figure 1:
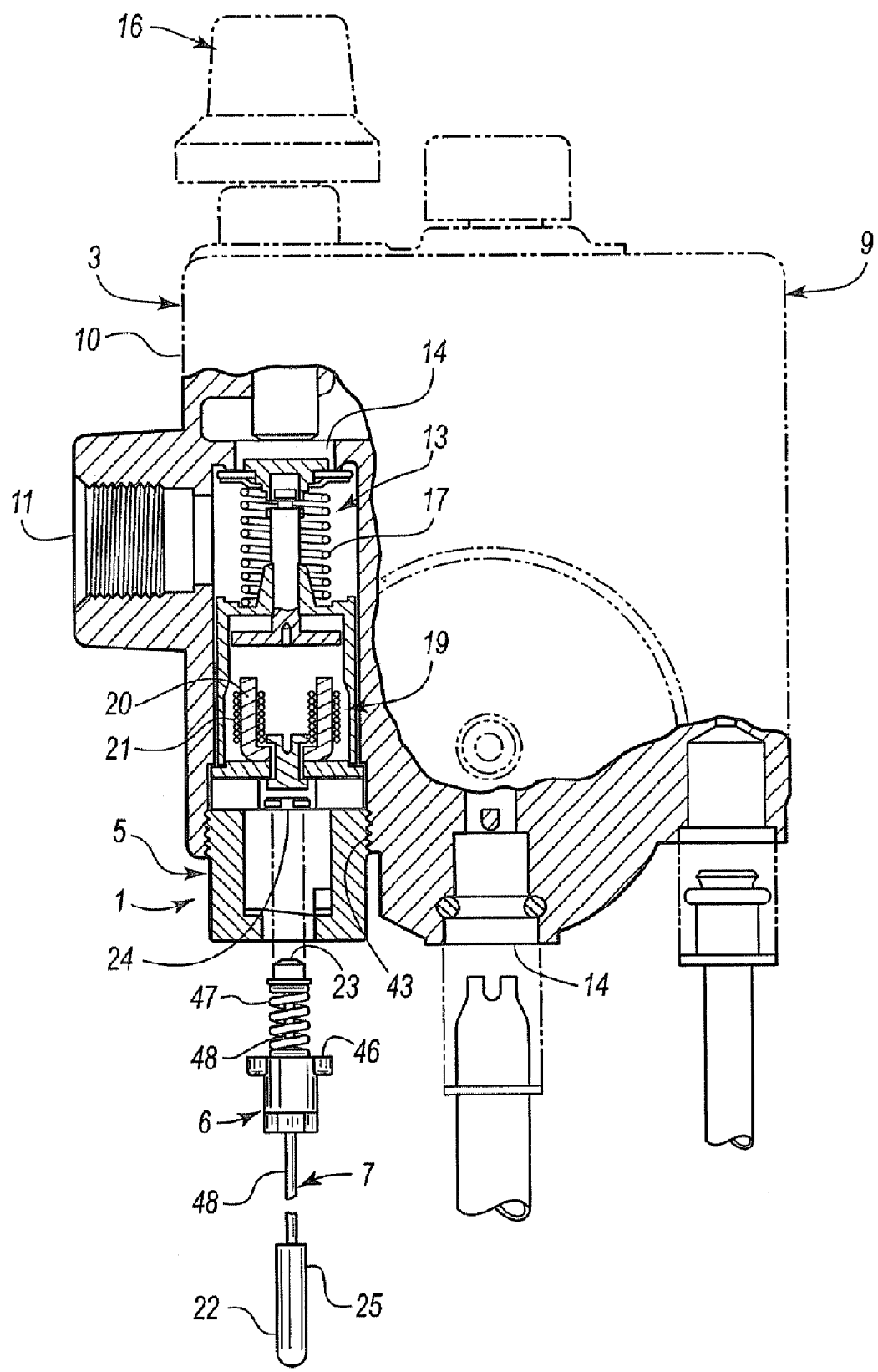
FIG. 1 is a fragmentary side elevation view of a fuel control unit with portions broken away to show details of portions of the internal construction.

In the following detailed description, numerous specific aspects are set forth in order to provide a thorough understanding of the invention. However, it will be understood by those skilled in the art that the present invention may be practiced without these specific details. In other instances, well-known methods, procedures and components have not been described in detail so as to obscure the present invention.

A thermocouple mounting assembly that is adapted for mounting to a body 3 is generally indicated by numeral 1. The mounting assembly 1 includes retainers indicated by numerals 5 and 6. The thermocouple assembly 7 is adapted to be mounted to the body 3 by interengagement of portions of the retainers 5 and 6 forming a shielded bayonet mounting arrangement. The thermocouple mounting assembly 1, including retainer 5 and/or retainer 6, is preferably molded. This can include any of a wide variety of metal molding processes, including but is not limited to, die casting and investment casting.

The body 3 can be any suitable device which needs to be coupled with a thermocouple assembly 7 for either sensing of the temperature of a portion thereof or to provide an output signal or current from the thermocouple assembly 7. In the illustrated embodiment, the body 3 is part of a fuel control unit designated generally 9. A suitable fuel control unit is disclosed in U.S. Pat. No. 6,010,327, the disclosure of which is incorporated herein by reference. The illustrated fuel control unit 9 includes a housing 10 with an inlet port 11 for selectively providing a feed of fuel preferably of a hydrocarbon type such as natural gas, fuel oil or the like to an outlet port 14 and on to a downstream device such as a burner with a pilot. A valve mechanism 13 in the body 3 is operable, upon command, to selectively allow fuel to flow through the outlet 14 (indicated in two (2) places) and then onto a burner or the like. The valve mechanism 13 is biased to a normally closed position and may be manually opened by a push down to start mechanism, designated generally by numeral 16, as are known in the art. A resilient member such a coil spring 17 may be used to bias the valve mechanism 13 to its normally closed position.

A suitable mechanism, designated generally by numeral 19, is provided to move the valve mechanism 13, upon suitable command, to an open position and to release the valve mechanism 13 to return to its normally closed position also upon command. In the illustrated structure, the suitable mechanism 19 includes an electromagnet 20 selectively powered by a coil 21. The coil 21 is powered by the thermocouple assembly 7 when enough heat or temperature is sensed or received by a thermocouple sensing end 22 for the thermocouple assembly 7, which will generate enough current to power the coil 21 to move the valve mechanism 13 to its open position.

Figure 6:
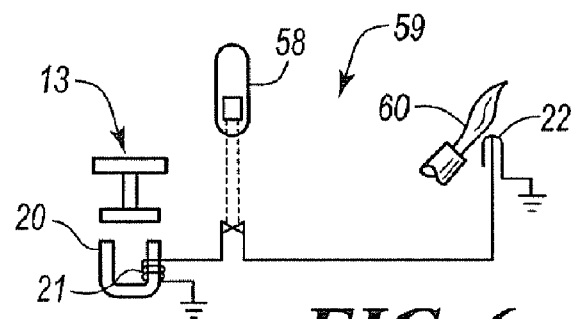
FIG. 6 is a schematic of a thermocouple control system.

When the output of the thermocouple sensing end 22, which includes a bimetallic joint in a protective housing 25, is insufficient to power the coil 21 sufficiently, the coil spring 17 overcomes the magnetic attraction force induced by the coil 21 allowing the valve mechanism 13 to move its closed position. In the illustrated structure, the thermocouple assembly 7, includes a contact end 23, which is in electrical contact with a contact assembly 24 which provides a circuit to the electromagnet 20 only if, for example, the water in a water heater is not hot enough as determined by a set point on a thermostat. The thermocouple assembly 7, in the case of use on a fuel control unit, is part of a safety circuit that must be activated to indicate that the pilot light 60, as shown in FIG. 6, is lit before the valve mechanism 13 can open allowing fuel to flow to the burner.

Figure 2:
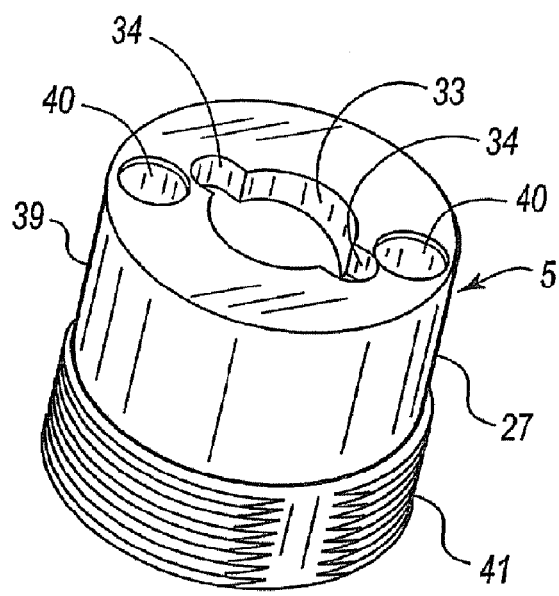
FIG. 2 is an enlarged perspective view of one retainer of a thermocouple mounting assembly.
Figure 3:
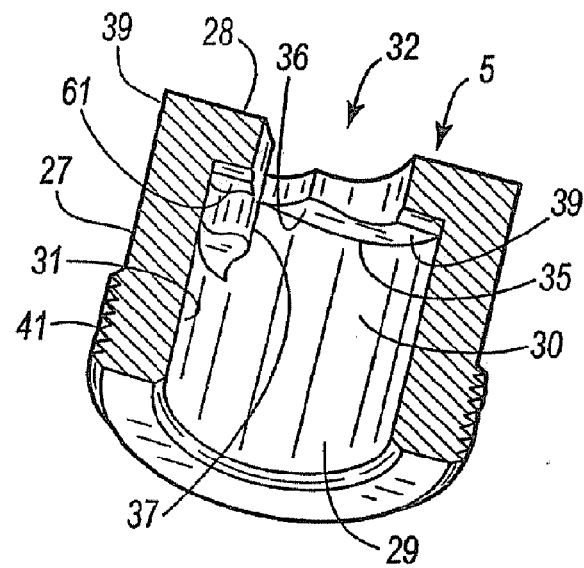
FIG. 3 is a fragmentary perspective view of the retainer of FIG. 2 with portions broken away to show internal structure.

In a preferred embodiment, the retainer 5 is adapted for removable mounting to the body 3. However, it is to be understood that the retainer 5 could be an integral part of the body 3. In the illustrated embodiment, as seen in FIGS. 2, 3, the retainer 5 has a sidewall 27, an end wall 28 and an open end 29 that is opposite of the end wall 28. The retainer 5 includes an internal chamber 30 that opens on the open end 29 and is partially defined by an interior surface 31 of the sidewall 27. The end wall 28 has a through opening 32 for receipt of a portion of the thermocouple assembly 7 therethrough.

A means is provided for cooperative interengagement to releasably secure the retainer 6 and a portion of the thermocouple assembly 7 within the retainer 5, as more fully described below. In a preferred embodiment, the through opening 32 has a generally cylindrical portion 33 and at least one and preferably two side projecting portions 34. On the inside surface of the end wall 28, there is provided at least one and preferably two cams 35 that includes a level end surface portion 36, i.e., generally normal to a plane transversely through the longitudinal axis of the internal chamber 30 and adjacent to a respective two side projecting portion 34, as well as projecting inwardly from the sidewall 27. The cam 35 also includes an inclined portion 39 which inclines in a direction generally from the end wall 28 toward the open end 29 and projects inwardly from the sidewall 27. An ear stop 37 is associated with at least one of the cams 35 to limit the rotation of the retainer 6 in the retainer 5 by interengagement between portions thereof as later described. The side surfaces defining the internal chamber 30 are all characterized by having an absence of a component facing generally toward the end wall 28, i.e., generally parallel to the longitudinal axis of the internal chamber 30 or outwardly flaring. That is, the interior surface 31 would be either cylindrical or flaring outwardly toward the open end 29 but not inwardly for the extraction of a mold plug utilized in a preferred method of formation of the retainer 5. Preferably, there are no undercuts or other surface defining elements that would have any substantial portion facing toward the end wall 28 which would lock a mold plug to the retainer 5.

The end wall 28 or inclined portion 39 of sidewall 27 is preferably provided with a tool engaging portion to assist in attaching the retainer 5 to the body 3. In the illustrated embodiment, spanner wrench pin recesses 40 are located in the end wall 28. The inclined portion 39 may be threaded as indicated at numeral 41 for threaded engagement with an interior threaded matching surface 43 forming a well 42. The spanner wrench pin recesses 40 and sidewall 27 are designed so as to provide the ability to form the retainer 5 by molding. A preferred material for the retainer 5 is an aluminum or magnesium alloy. Preferably, the material of the body 3 and the retainer 5 are compatible to prevent galvanic currents from being generated and resulting corrosion at the threaded connection of thread engagement 41 and the interior threaded matching surface 43, as shown in FIGS. 1, 2 and 3.

Figure 5:
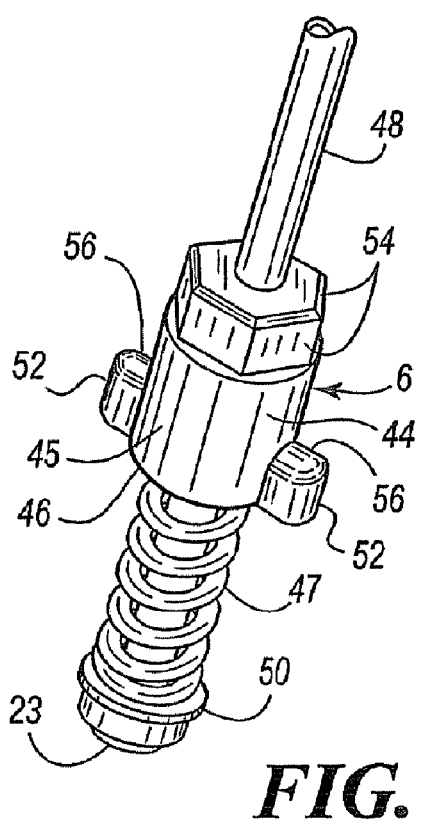
FIG. 5 is an enlarged fragmentary perspective view of a second retainer and portion of a thermocouple.
Figure 4:
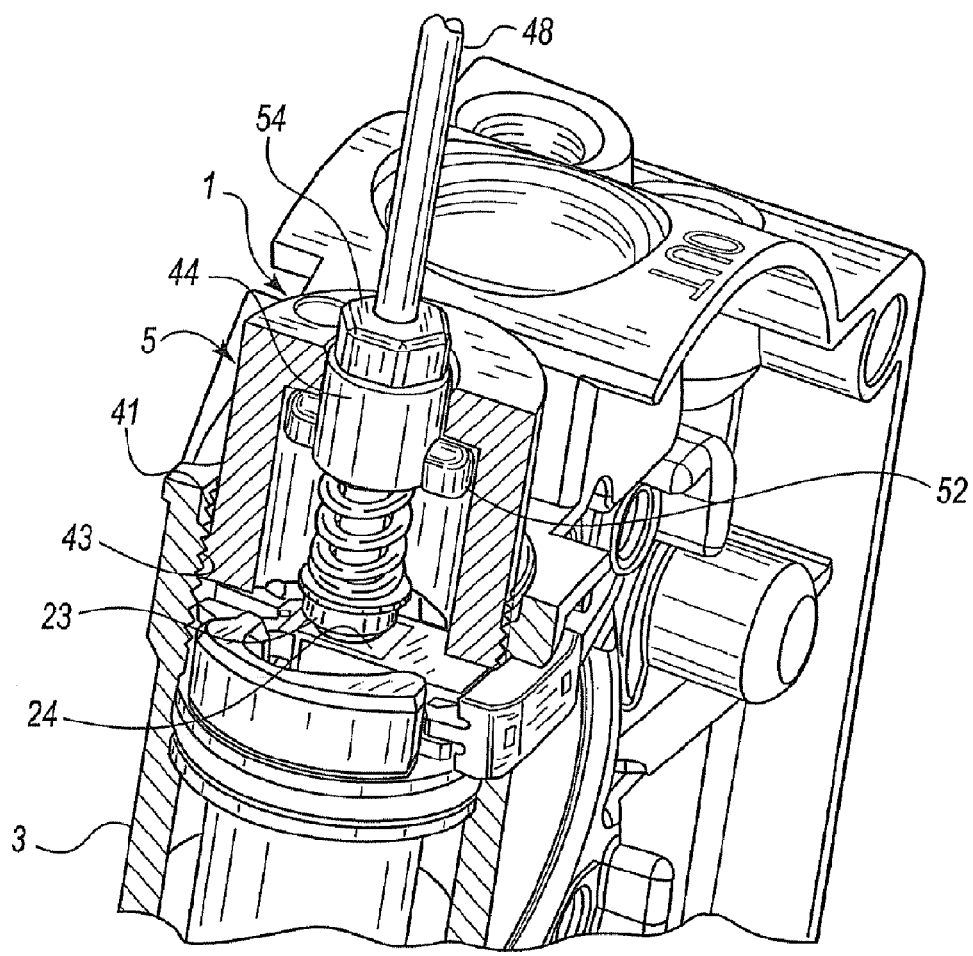
FIG. 4 is a perspective view of the thermocouple mounting assembly with portions broken away to show internal details of the mounting assembly and portions of the fuel control unit shown in FIG. 1.

Referring now to FIGS. 1, 4 and 5, the retainer 6 includes a shank 44 that preferably has a generally cylindrical portion 45 with an end face 46. A resilient member 47, e.g., coil spring, can be mounted on a tubular portion 48 of thermocouple assembly 7 for a purpose to be later described. The shank 44 is also moveably mounted on the tubular portion 48. In the illustrated structure, the thermocouple assembly 7 also has the electrical contact end 23 and a generally radially extending flange 50. The resilient member 47 is captured between the end face 46 of the retainer 6 and the radially extending flange 50 and when the retainer 6 is mounted to the retainer 5, it urges the contact end 23 into contact with a contact assembly 24 or a portion of the body 3. The shank 44 is sized and shaped to be received within the cylindrical portion 33 for longitudinal and rotational movement therein. The shank 44 has outwardly extending projections such as ears 52 that are sized, shaped and positioned to be received through the two side projecting portions 34.

An upper portion of the retainer 6 is provided with means for assisting in turning the shank 44 when the ears 52 are in the internal chamber 30 to releasably mount the retainer 6 to the retainer 5. As shown, the means includes a series of wrench flats 54 with four or six being a suitable number. Wings such as found on wing nuts may also be used in place of the wrench flats 54. However, the use of exposed projections from the shank 44 could result in accidental dislodgment or decoupling of the retainer 6 from the retainer 5. Preferably, the means to assist turning the retainer 6 does not project outwardly or significantly outwardly from the shank 44. The ears 52 have cam engaging surfaces or shoulders 56 that are shaped and positioned to engage a respective cam 35 to retain the retainer 6 releasably mounted to the retainer 5 and a portion of the thermocouple assembly 7 positioned at a desired location. The length of the level end surface portion 36 is such as to allow from about 10° to about 20° of rotation of the retainer 6 relative to the retainer 5 before the ears 52 each engage the respective inclined portion 39.

In the illustrated embodiment as shown in FIG. 6, the contact end 23 is held in engagement with a contact assembly 24 which is a portion of an electrical control circuit 59 when the burner (not shown) is needed to provide heat. Thus, the thermocouple assembly 7 indicates that a pilot light 60 is lit while the electrical control circuit 59 also provides a signal that heat is needed and when the complete circuit is made the electromagnet 20 is energized urging the valve mechanism 13 to open. When adequate heat has been supplied, the electrical control circuit 59 provides an open circuit deenergizing the electromagnet 20. The electromagnet 20 may also be deenergized if the pilot flame 60 heating the thermocouple assembly 7 is out. A heat sensitive switch 58 may also be provided that provides an indication, e.g., indicates that the water requires heat.

Figure 7:
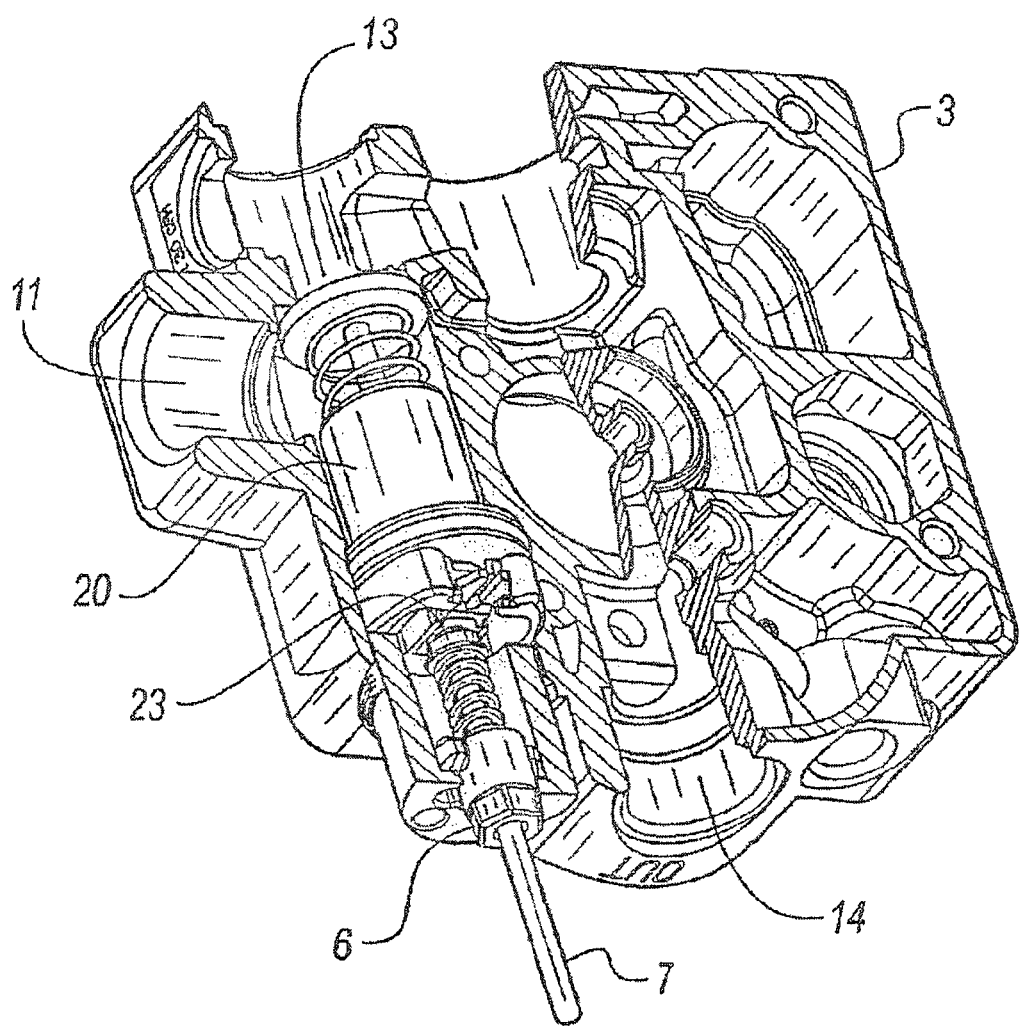
FIG. 7 is a perspective view of a fuel control unit with portions broken away to show internal details.

Referring now to FIGS. 4 and 7, a thermocouple assembly 7 may be coupled to the body 3 by first installing the retainer 5 to the body as by effecting the threaded engagement between the threaded engagement 41 and the interior threaded matching surface 43. The retainer 6 is then installed to effect contact between the contact end 23 and the contact assembly 24 by inserting the lower portion of the retainer 6 into the through opening 32 through the generally cylindrical portion 33 and directing the ears 52 into and through the two side projecting portions 34. By rotation of the retainer 6 relative to the retainer 5 the ears 52 are moved into engagement with the level end surface portions 36 of the cams 35. The retainer may be installed with an initial installation step, by hand, by moving the ears 52 onto the level end surface portions 36, where the force of the resilient member 47 will retain the retainer 6 in the retainer 5. The installer may then obtain a wrench to effect complete installation by further turning of retainer 6. This construction is particularly effective in an upside down installation as seen in FIG. 1. The resilient member 47 will be compressed to ensure releasable engagement between the retainer 6 with the retainer 5. Ear retaining indentations 61 may also be provided in the cams 35 to mechanically interengage with the ears 52 to help resist relative rotation to effect disengagement of the retainer 6 from the retainer 5. When the retainer 6 is installed and at the end of relative rotation which is about 90° of rotation, the ears 52 move into the ear retaining indentations 61 generating an audible sound like a snap or click to inform the installer that installation is complete. As can be seen, almost all components of the retainer 6 are positioned in the retainer 5 and thus shielded to help prevent accidental disengagement of the retainer 6 from the retainer 5. Contrary to a typical bayonet thermocouple mounting device, the male portion (ears 52) of the mounting assembly 1 is mounted to the thermocouple assembly 7 while the female portion (internal chamber 30 and cams 35) of the mounting assembly 1 is mounted to the body 3.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

What is claimed is:

1. A thermocouple contact mounting arrangement comprising:
   a body;
   a first retainer removably mounted to the body, said first retainer having an internal chamber and a first opening providing a first access to the chamber and a second opening providing a second access to the chamber;
   a thermocouple assembly includes a portion thereof in the chamber and extending through the second opening;
   a second retainer disposed around a portion of the thermocouple assembly and includes a portion extending through the second opening and into the chamber;
   a resilient member disposed between a free end of the thermocouple assembly and the second retainer;
   a bayonet mounting arrangement associated with the first retainer and the second retainer for securing the second retainer to the first retainer by relative rotation, the bayonet mounting arrangement including an ear having a shoulder mounted to one of the first retainer and the second retainer and a cam defined on the other of the first retainer and the second retainer and interengageable with the shoulder of the ear to releasably mount the second retainer to the first retainer, the ear and the shoulder being positioned in the chamber when the second retainer is mounted to the first retainer, and the cam having an ear retaining indentation, wherein the ear is disposed within the ear retaining indentation when the second retainer is mounted to the first retainer to prevent rotation of the first retainer relative to the second retainer, and wherein the resilient member biases the ear towards the ear retaining indentation.

2. The thermocouple contact mounting arrangement as set forth in claim 1, wherein the first retainer includes the cam and the second retainer includes the at least one ear.

3. The thermocouple contact mounting arrangement as set forth in claim 2, wherein the first retainer includes a sidewall and opposite ends, one end of the opposite ends includes the first opening and another end of the opposite ends includes a first end wall with an inner surface and an outer surface, the second opening extending through the first end wall.

4. The thermocouple contact mounting arrangement as set forth in claim 3, wherein the cam includes an inclined surface extending from the inner surface and facing the first opening.

5. The thermocouple contact mounting arrangement as set forth in claim 4, wherein the first retainer includes an inner sidewall partially defining the chamber, the cam extending inwardly from the inner sidewall.

6. The thermocouple contact mounting arrangement as set forth in claim 5, wherein the first opening, the inner sidewall and the cam being shaped so as to permit their formation by molding over a male plug extractable from the chamber.

7. The thermocouple contact mounting arrangement as set forth in claim 6, wherein the second retainer includes a plurality of the ears projecting outwardly from a portion thereof and the first retainer includes a plurality of the cams.

8. The thermocouple contact mounting arrangement as set forth in claim 7, wherein the second retainer includes a generally cylindrical portion and the plurality of ears projecting from opposite sides thereof.

9. The thermocouple contact mounting arrangement as set forth in claim 8, wherein the second opening includes a generally cylindrical portion and a plurality of opening portions projecting outwardly of the generally cylindrical portion with the generally cylindrical body portion being adapted to extend through the second opening generally cylindrical portion and the plurality of opening portions being adapted to receive the ears therethrough.

10. The thermocouple contact mounting arrangement as set forth in claim 6, wherein the first retainer includes a generally cylindrical exterior sidewall includes at least a portion thereof threaded.

11. The thermocouple mounting arrangement as set forth in claim 4, wherein the cam including a level surface extending from one end of the inclined surface providing a lead-in for the ear to the inclined surface.

12. The thermocouple mounting arrangement as set forth in claim 11, wherein the cam includes the ear retaining indentation adjacent an end of the inclined surface.

13. The thermocouple arrangement as set forth in claim 12, wherein the first retainer includes an ear stop that is adjacent the ear retaining indentation.

14. The thermocouple arrangement as set forth in claim 1, wherein the first retainer includes a molded inner chamber and a molded first opening providing a first access to the molded chamber and a second opening providing a second access to the molded chamber.

15. The thermocouple arrangement as set forth in claim 1, wherein the second retainer associated with the thermocouple assembly includes a molded portion extending into the chamber through the second opening.

16. The thermocouple arrangement as set forth in claim 13, wherein there is an audible sound when the ear stop of the first retainer is positioned adjacent to the ear retaining indentation.

17. A method for utilizing a thermocouple contact mounting arrangement comprising:
removably mounting a first retainer to a body, wherein the first retainer includes an internal chamber and a first opening providing a first access to the chamber and a second opening providing a second access to the chamber;
positioning a portion of a thermocouple assembly in the chamber;
extending the thermocouple assembly through the second opening; and
providing a resilient member disposed between a free end of the thermocouple assembly and a second retainer, the second retainer disposed around a portion of the thermocouple assembly;
securing the second retainer to the first retainer by relative rotation, wherein the second retainer is associated with the thermocouple assembly and includes a portion extending through the second opening and into the chamber and there is a bayonet mounting arrangement associated with the first retainer, wherein the bayonet mounting arrangement includes an ear having a shoulder mounted to one of the first retainer and the second retainer and a cam defined on the other of the first retainer and the second retainer and interengageable with the shoulder of the ear to releasably mount the second retainer to the first retainer, the ear and the shoulder being positioned in the chamber when the second retainer is mounted to the first retainer, and the cam having an ear retaining indentation, wherein the ear is disposed within the ear retaining indentation to prevent counter rotation between the first and second retainers, and wherein the resilient member biases the ear towards the ear retaining indentation.

18. The method for utilizing a thermocouple contact mounting arrangement as set forth in claim 17, wherein an audible sound is present when the second retainer is releasably mounted to the first retainer as the ear is disposed within the ear retaining indentation.

* * * * *